United States Patent [19]

Batchelder et al.

[11] Patent Number: 5,046,941
[45] Date of Patent: Sep. 10, 1991

[54] APPARATUS FOR MOLDING MULTICOLOR THIN WALL PLASTIC SHELL

[75] Inventors: Bruce A. Batchelder, Barrington; John D. Gray, New Durham, both of N.H.

[73] Assignee: Davidson Textron Inc., Dover, N.H.

[21] Appl. No.: 420,942

[22] Filed: Oct. 13, 1989

[51] Int. Cl.5 .................. B29C 41/04; B29C 41/22
[52] U.S. Cl. ..................... 425/435; 249/129; 249/131; 264/245; 264/310; 264/DIG. 60; 425/182; 425/425; 425/434
[58] Field of Search ............ 425/434, 435, 425, 257, 425/182; 264/310, 311, 245, 250, DIG. 60; 249/129, 131, 160

[56] References Cited

U.S. PATENT DOCUMENTS

| 4,783,302 | 11/1988 | Kurimoto | 264/245 |
| 4,790,510 | 12/1988 | Takamatsu et al. | 425/435 |

FOREIGN PATENT DOCUMENTS

| 59-156710 | 9/1984 | Japan. | |
| 59-159309 | 9/1984 | Japan | 264/245 |
| 63-116812 | 5/1988 | Japan | 264/245 |

Primary Examiner—Jay H. Woo
Assistant Examiner—James P. Mackey
Attorney, Agent, or Firm—John C. Evans

[57] ABSTRACT

An apparatus (40) for molding a thin walled plastic shell includes a mold box (42) having an inner mold surface (48). A powder box (52) includes an internal chamber and first divider wall (54) for separating the internal chamber into at least two sections (56,58). A carrier framework (60) is removably mounted on the mold box (42) and includes a peripheral seal for perfecting a seal between the mold box (42) and the powder box (52) when the same are connected thereto. A second divider wall (64) is connectable to the first divider wall (54) separating the inner mold surface into two chambers continuous with the two sections of the powder box (52). The carrier framework (60) further includes a mold surface seal (66) for perfecting a seal between the second divider wall (64) and mold surface (48).

2 Claims, 1 Drawing Sheet

APPARATUS FOR MOLDING MULTICOLOR THIN WALL PLASTIC SHELL

TECHNICAL FIELD

The present invention relates to an apparatus for molding a thin wall plastic shell. More particularly, the present invention relates to molding a multicolor thin wall plastic shell suitable for use in automobile trim components such as interior door panels.

BACKGROUND ART

Slush mold methods and apparatus have been used for processing plastic powder to form articles such as interior door panels having two or more tone colors.

Generally, the mold apparatus includes a mold body having a molding surface which is clamped to a plastisol charge box. The plastisol charge box includes at least one divider for dividing the box into plural sections, each section containing a different color plastisol. As disclosed in the Gray U.S. Pat. No. 4,562,025, issued Dec. 31, 1985, Gray U.S. Pat. No. 4,610,620, issued Sept. 9, 1986, and Kurimoto U.S. Pat. No. 4,783,302, issued Nov. 8, 1988, the divider extends from the powder box so as to sealingly engage the mold surface of the mold box. The mold box is clamped to the powder box. The mold surface is heated, such as by convection current, hot oil, or other means known in the art. The charge box and mold are then rotated so that the plastisol is distributed into each mold section by gravity flow with the plastisol from each section flowing to the divider which separates this color so as to form two or more tones on a resultant shell of cured material.

Presently, two tone color changes are made by first emptying the dry plastisol or drysol out of the powder box and then vacuuming the remaining loose powder out of the box before adding the desired new color. A similar procedure is used with monotone and two tone casting processes.

In using the prior art system, before an elevator containing the powder box can be retracted from the mold box, the elevator must be lowered the total distance from the top of the powder box divider to the top of the two tone seal, dictating facility capability.

The present invention provides a more efficient and effective means allowing color change without the previously necessary emptying and vacuuming of a powder box associated with a single mold assembly. The present invention allows on-line color changes without emptying and cleaning of the complete powder box. The present invention further reduces the set up time of a two tone seal and divider panel system.

SUMMARY OF THE INVENTION

In accordance with the present invention there is provided an apparatus for molding a thin wall plastic shell, the apparatus including a mold box including an inner mold surface and a powder box including an internal chamber and first divider means for separating the internal chamber into at least two sections. A carrier framework removably mounted on the mold includes peripheral seal means for perfecting a seal between the mold member and the powder box when the same are connected thereto. A second divider means is connectable with the first divider means for separating the inner mold surface and two chambers continuous with the two sections of the powder box. Mold surface sealing means perfects a seal between the second divider means and the mold surface. A single carrier frame work is selected for a given color combination and is dedicated to mating color boxes of a select color combination to the mold member. When a new color combination is to be processed the first carrier framework is removed and a second carrier framework dedicated for use with the second color combination is substituted in its place. Since the dedicated carrier framework and color boxes have the same use in each process there is no need to empty and vacuum powder boxes used for a given color.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
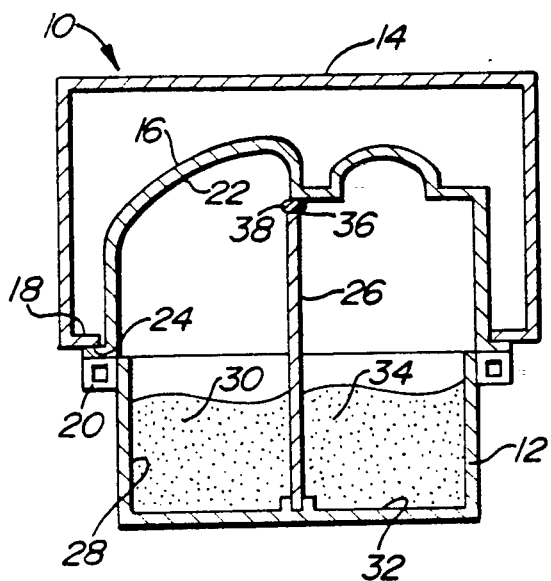
FIG. 1 is a cross sectional view of a conventional prior art molding apparatus.

A conventional one piece powder box assembly is shown at 10 in FIG. 1. The assembly comprises a powder box 12 and mold box 14 which would be clamped together by suitable means well known in the art. A removable mold surface member 16 is clamped between an inwardly extending lip 18 of the mold box 14 and a collar 20 which is fixedly connected to the powder box 12. The mold surface member 16 can be an electroform of nickel composition having suitable thermal conductivity as is well known in the art. The mold member 16 has surface 22 defining the shape of the part to be molded. Outwardly extending flange 24 of the mold surface member 16 is clamped between the lip 18 and collar 20.

The mold assembly 10 is of the type for molding a thin wall plastic shell from two or more tones of a plastisol. To achieve this ends, powder box 12 includes an inner chamber which is divided by a divider wall 26. The divider wall 26 defines two sections of the inner chamber of the powder box 12 whereby a first section 28 contains a first colored plastisol 30 and a second chamber 32 includes a second colored plastisol 34. The divider wall 26 includes an upper edge 36 having a seal 38 disposed along the length thereof, the seal 38 perfecting a seal between the edge 36 of the divider wall 26 and the mold surface 22.

Conventionally, the mold 14 would include a heating mechanism for heating the mold surface member 16. In operation, the mold is rotated so that the plastisol is distributed into each mold section by gravity flow with the plastisol from each section flowing to the dividing wall 26 which separates the color so as to form two or more tones on a resultant shell of cured material.

As discussed above, it is often necessary during production runs to change the two tone colors in the powder box 12. This process requires first emptying the plastisol out of the powder box and then vacuuming the remaining loose powder out of the box before adding the desired new color.

Figure 3:
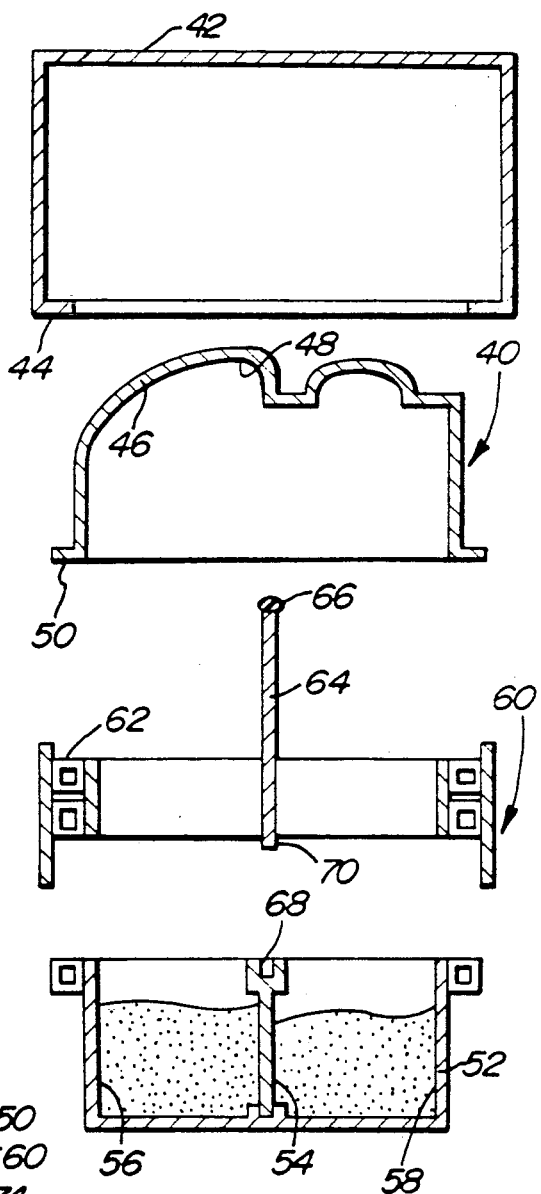
FIG. 3 is a side elevational exploded view of the present invention.
Figure 2:
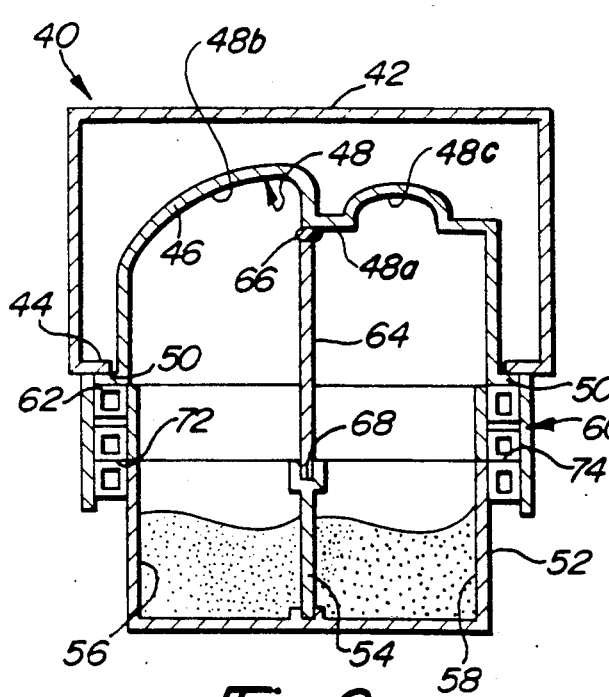
FIG. 2 is a cross sectional elevational view of a molding apparatus constructed in accordance with the present invention.

The present invention provides for color changes without emptying and cleaning of the complete box. The invention is generally shown at 40 in FIGS. 2 and 3.

The apparatus 40 includes a mold box 42 including an inwardly extending peripheral shoulder 44. A mold surface member 46 includes an inner surface 48 over which a shell is molded having a raised rib 48a formed between two casting surface segments 48b and 48c. The mold surface member 46 further includes an outwardly extending flange 50. A powder box 52 includes an internal chamber divided by a divider wall 54 into two sections 56,58. Of course, more structurally complicated forms of the invention can be constructed including more than two sections of a powder box thereby including further divider walls.

The apparatus 40 includes a carrier framework generally indicated at 60 removably mounted on the mold 42 as by clamping or other means. The carrier framework 60 includes a peripheral seal 62. The peripheral seal 62 is adapted to clamp the flange portions 50 of the mold member 46 against the inwardly extending shoulder of the shoulder 44 by clamping means known in the art. Thusly, the carrier framework 60 and mold box 42 can comprise a joined unit.

The peripheral edge 62 provides seal means for perfecting a seal between the mold box 42 and the powder box 52 when the same are connected together as by further clamping means. In other words, the assembly consisting of the mold box 42, mold surface member 46, and carrier framework 60 can be connected and disconnected from the powder box 52 as desired.

The carrier framework 60 includes a second divider wall 64 which is connectable with the first divider wall 54 for separating the mold surface 48 into two sections or chambers which are continuous with the two sections 56,58 of the powder box. Seal 66 is mounted on the upper edge of the second divider wall 64 for perfecting a seal between the second divider wall 64 and the mold surface 46.

The first divider wall 54 includes an end portion defining a channel 68 along the length thereof. The second divider wall 64 supported by the carrier framework 60 includes an edge portion 70 removably and sealingly seated in the channel 68 when the powder box 52 is connected to the mold box 42 and through the carrier framework 60 thereby forming the apparatus 40 including two closed inner chamber 56,58.

The invention provides the carrier framework 60 which houses the two tone divider wall 64, the seal 66 which perfects a seal between the divider wall 64 and the mold surface 46, and a peripheral or perimeter powder box sealing surface 72 which is fixedly clamped to the powder box sealing surface 74.

The carrier framework 60 can receive and be fixedly clamped to the powder box 52 which effectively has an extension 54 of the two tone divider wall 64 inside. The powder box 52 is interchangable with any number of carrier frames. However, the carrier frames 60 for two tone molding systems remain set up to one individual mold surface member or electroform 48 and mold box 42, such as of the hot air and cooling box type shown in U.S. Pat. No. 4,683,098. Thus, it is possible to change colors by moving various powder boxes from station to station.

In normal operation, the use of a carrier framework dedicated to one color combination and separate powder box system reduces the set up time of the two tone seal and divider panel system. Further, it allows on line color changes without emptying and cleaning the individual powder boxes used for a given color combination.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. Apparatus for molding a thin-walled plastic shell from plastisol in apparatus including a heated mold member and a powder box for storing the plastisol for distribution against the heated mold member the improvement comprising:

said mold member having a mold surface divided into first and second casting segments separated by a raised rib therebetween;

said powder box including an internal chamber and a first divider means carried by said powder box for movement therewith for separating said internal chamber into at least two sections having plastisol therein of a selected color combination, said powder box having an open end for distributing plastisol from said at least two sections; and a carrier framework located between said mold member and said powder box removably mounted on both said mold member and said powder box to from a passage for flow of plastisol from said powder box to said mold member; said carrier framework including sealing means for perfecting a seal between said mold member and said powder box when said mold member, said carrier framework and said powder box are connected together;

said carrier framework being separable from said mold member and dedicated for use solely with a powder box having a selected color combination;

second divider means carried by said carrier framework and engageable with said first divider means for forming at least two chambers for passage of plastisol from said at least two sections of said powder box; and mold surface sealing means for perfecting a seal between said second divider means and said raised rib of said mold surface.

2. An apparatus as set forth in claim 1 wherein said first divider means includes a first divider wall within said internal chamber dividing said internal chamber into said at least two sections; said first divider wall including an end portion thereon located at said open end of said powder box and having a predetermined length;

means defining a channel in said end portion along said predetermined length thereof;

said second divider means including a second divider wall supported by said carrier framework and including an edge portion removably and sealingly seated in said channel when said powder box is connected to said mold box and said carrier framework for forming said at least two chambers for passage of plastisol from said at least two sections of said powder box.

* * * * *